United States Patent [19]
Miura

[11] Patent Number: 5,966,466
[45] Date of Patent: Oct. 12, 1999

[54] STILL IMAGE ENCODER

[75] Inventor: Tsuyoshi Miura, Kawasaki, Japan

[73] Assignee: Fujitsu Limited, Kanagawa, Japan

[21] Appl. No.: 08/936,315

[22] Filed: Sep. 24, 1997

[30] Foreign Application Priority Data

Mar. 18, 1997 [JP] Japan ................................ 9-065029

[51] Int. Cl.⁶ .................................................. G06K 9/00
[52] U.S. Cl. .......................................... 382/236; 382/238
[58] Field of Search ................................. 358/425, 426, 358/428; 348/218, 598, 412, 413, 420, 405, 401, 700, 384, 607, 701; 382/171, 173, 302, 305, 307, 232, 233, 234, 235, 236, 238, 239, 240, 241, 243, 244, 248, 251, 252, 253, 284, 294

[56] References Cited

U.S. PATENT DOCUMENTS

| 5,191,413 | 3/1993 | Edgar ........................................ 358/105 |
| 5,237,413 | 8/1993 | Israelsen et al. ......................... 358/160 |
| 5,274,442 | 12/1993 | Murakami et al. ..................... 358/133 |
| 5,347,309 | 9/1994 | Takahashi ................................ 348/401 |
| 5,657,402 | 8/1997 | Bender et al. ............................ 382/284 |

FOREIGN PATENT DOCUMENTS

| 3-1688 | 1/1991 | Japan .............................. H04N 7/13 |
| 5-49018 | 2/1993 | Japan .............................. H04N 7/13 |
| 6-70303 | 3/1994 | Japan ............................. H04N 7/133 |
| 7-95566 | 4/1995 | Japan .............................. H04N 7/24 |

*Primary Examiner*—Bijan Tadayon
*Attorney, Agent, or Firm*—Helfgott & Karas, P C.

[57] ABSTRACT

According to the still image encoder, as to frame data inputted from the digital video camera, odd field data is held in the odd field memory and even field data is held in the even field memory. The control section divides odd field data and even field data into predetermined blocks, calculates the absolute value total of differences between each pixel data in odd field data and each pixel data in even field data, and compares the total with the predetermined threshold. The DMA controller transfers pixel data of the block in the odd field data to the even field memory when the total is larger than the threshold. The control section codes frame data consisting of odd field data and even field data into JPEG data.

7 Claims, 13 Drawing Sheets

BORDER LINE

STILL IMAGE ENCODER

BACKGROUND OF THE INVENTION

1. Field of the Invention

The present invention relates to a still image encoder for producing still image data from moving image data and coding the produced still image data.

2. Description of the Related Art

Conventionally, a image transmission apparatus is used for a video conference system to hold a conference with persons at a long distance, or the like. Recently, this image transmission apparatus is also used for a remote monitoring system to monitor an accident, a disaster and the like at a long distance in addition to the above-mentioned video conference system.

In this image transmission apparatus, to make an original broad band of the moving image data less than a band of a communication circuit or the like, the moving image data is coded into data conforming to MPEG (Moving Picture Experts Group), and then transmitted. Thus, the moving image data decoded at a receiving side is rougher than the original moving data, for example, the decoded moving image includes noises.

For example, in the video conference system, when moving image data obtained by taking characters written in documents or a blackboard is transmitted by the conventional video transmission equipment, in a receiving side, a receiving device receive the moving image data, and make a result of the decoding process display a display device. Thus, a taken image of caracters written in documents or blackbord is displayed by the display device. In this case, there is a possibility that it is difficult to read the characters.

Further, in the above-mentioned remote monitoring system, when an accident, a disaster or the like occurs, a fine image in which an object or the like moves unsatisfactorily is required as a image to be displayed by the display device rather than a rough image in which an object or the like moves satisfactorily.

In that case, it is also considered to use a still image encoder for a video conference system, a remote monitoring system and the like. That still image encoder codes one-frame data extracted from frame data to be moving data into data conforming to a loss-less coding method in JPEG (Joint Photographic Coding Experts Group), data conforming to a lossy coding method in JPEG and having a data loss less than in MPEG or the like (hereinafter, data of these two types is called "JPEG data"), data conforming to ITU (International Telecommunication Union)-T Recommendation H.261 Annex-D or another data.

However, as to a moving image signal conforming to NTSC (National Television System Committee), one frame is interlaced with two fields. Thus, there is a difference between timings at which two fields to be one frame are taken. Thus, when frame data for one frame (data for two fields) is extracted as still image data, an image of an object which moves dynamically is blurred, therefore, there is a case that the image can not be recognized visually.

It is also considered that one field is extracted from two fields to be one frame and is coded. In this case, however, a image quality lowers all over the image.

SUMMARY OF THE INVENTION

The present invention is achieved in view of the above-described problems, therefore, it is an object thereof to provide a still image encoder for producing and coding still image data in which an image of an object moving dynamically is prevented to be blurred while an image of an object which moves slightly is kept clear.

The first aspect of the present invention is a still image encoder comprising a moving image data input section for inputting moving data consisting of frame data in which first field data and second field data are interlaced, a first field data holding section for holding the first field data, a second field data holding section for holding the second field data to be one frame data together with the first field data held by the first field data holding section, a moving object area detecting section for detecting data area for a image which moves dynamically among frame data consisting of the first field data held by the first field data holding section and the first field data held by the second field data holding section, a data transfer section for extracting data in the data area in the first field data held by the first field data holding section and for transferring the data to the second field data holding section, a still image data generating section for generating still image data by interlacing the first field data held by the first field data holding section and the second field data held by the second field data holding section; and a still image data coding section for coding the still image data.

Here, the moving image data input section is a digital camera or the like, the first field data holding section and the second data holding section are RAM (Random Access Memory) and the like, the moving object area detecting section, the still image data generating section and the still image data coding section are CPU (Central Processing Unit), the data transfer section is CPU, DMA (Direct Memory Access).

According to the first aspect of the present invention, moving image data consisting of frame data in which the first field data and the second field data are interlaced is inputted by the moving image data input section. The first field data is held by the first field data holding section. The second field data to be one frame data together with the first field data held by the first field data holding section is held by the second field data holding section. Data of the image which moves dynamically is detected by the moving object area detecting section among frame data consisting of the first field data held by the first field holding section and the second field data held by the second field holding section. Data of the data area in the first field data held by the first field data holding section is extracted and transferred to the second field data holding section by the data transfer section. With the still data generating section, the first field data held by the first field data holding section and the second field data held by the second field data holding section are interlaced and the still image data is generated. The still image data is coded by the still image data coding section.

In this way, each pixel data in the data area for the image which moves dynamically in the first field data is transferred to the second field data, therefore, it is possible to generate the still image data from the moving data so as to omit blurring of the image for an object which moves dynamically while the image of the object which moves slightly is kept clear.

The second aspect of the present invention is a still image encoder, wherein the moving object area detecting section of the first aspect comprises a field data dividing section for respectively dividing the first filed data held by the first field holding section and the second filed data held by the second field holding section into blocks of a predetermined size, a field difference value calculating section for calculating an absolute value total of differences between each pixel data in the first field data and each pixel data in the second field data which are corresponded each other for each of the blocks, and a determining section for determining the block of which the absolute value total calculated by the field difference calculating means is larger than the predetermined threshold as data area for the image which moves dynamically, and the data transfer section transfers each pixel data in the block of the first field data determined as the data area of the image which moves dynamically by the determining section.

Here, the field data dividing section, the field difference calculating section and the determining section are CPU or the like.

According to the second aspect of the present invention, the first field data held by the first field data holding section and the second field data held by the second field data holding section are respectively divided into blocks of the predetermined size by the field data dividing section. For each block, an absolute value total of differences between each pixel data in the first field data and each pixel data in the second field data is calculated by the field difference calculating section. With the determining section, the block of which the calculated absolute value total of differences is lager than the predetermined threshold is determined as the data area for the image which moves dynamically. Each pixel data of the block in the first field data determined as the data area for the image which moves dynamically is transferred to the second field data holding section.

In this way, each pixel data of the block in the first field data determined as the data area for the image which moves dynamically is transferred to the second field data holding section, therefore, it is possible to generate the still image data from the moving data so as to omit blurring of the image for an object which moves dynamically while the image of the object which moves slightly is kept clear.

The third aspect of the present invention is a still image encoder, wherein the moving object area detecting section of the first aspect comprises a field data dividing section for respectively dividing the first filed data held by the first field holding section and the second filed data held by the second field holding section into blocks of a predetermined size, a field difference value calculating section for calculating an absolute value total of differences between each pixel data in the first field data and each pixel data in the second field data which are corresponded each other for each of the blocks, an in-field difference calculating section for calculating, for each pixel data in the first field data, an absolute value of a difference between the pixel data and a pixel data in a row next to a row of the pixel data and in a column equal to a column of the pixel data, and for calculating a total of calculated results for each of the blocks, and a determining section for determining the block of which the absolute value total calculated by the field difference calculating section is larger than the predetermined threshold as data area for the image which moves dynamically, and the data transfer section transfers each pixel data in the block of the first field data determined as the data area of the image which moves dynamically by the determining section to the second field data holding section.

Here, the field data dividing section, the field difference calculating section, the in-field difference calculating section and the determining section are CPU or the like.

According to the third aspect of the present invention, the first field data held by the first field data holding section and the second field data held by the second field data holding section are respectively divided into blocks of the predetermined size by the field data dividing section. For each block, an absolute value total of differences between each pixel data in the first field data and each pixel data in the second field data corresponded each other is calculated by the field difference calculating section. With the in-field difference calculating section, for each pixel data in the first field data, an absolute value of a difference between the pixel data and a pixel data in a row next to a row of the pixel data and in a column equal to a column of the pixel data is calculated, and a total of calculated results for each of the blocks is calculated. With the determining section, the block of which the absolute value total calculated by the field difference calculating section is larger than the predetermined threshold is determined as data area for the image which moves dynamically. Each pixel data of the block in the first field data determined as the data area for the image which moves dynamically is transferred to the second field data holding section by the data transfer section.

In this way, each pixel data of the block in the first field data determined as the data area for the image which moves dynamically is transferred to the second field data holding section, therefore, it is possible to generate and code the still image data from the moving data so as to omit blurring of the image for an object which moves dynamically while the image of the object which moves slightly is kept clear.

The fourth aspect of the present invention is a still image encoder further comprising a third field data holding section for holding the first field data inputted by the moving object data input section immediately before the first field data held by the first field data holding section is inputted, and a fourth field data holding section for holding the second field data to be one frame data together with the first field data held by the third field data holding section. In this apparatus, the moving object area detecting section comprises a field data dividing section for respectively dividing the first filed data held by the first field holding section, the second field data held by the second field holding section, the first field data held by the third field holding section and the second filed data held by the fourth field holding section into blocks of a predetermined size, a field difference value calculating section for calculating an absolute value of a difference between each pixel data in the first field data held by the first field data holding section and each pixel data in the first field data held by the third field data holding section which are corresponded each other and an absolute value of a difference between each pixel data in the second field data held by the second field data holding section and each pixel data in the second field data held by the fourth field data holding section which are corresponded each other, and for calculating a total of calculated results for each of the blocks, and a determining section for determining the block of which the absolute value total calculated by the field difference calculating section is larger than the predetermined threshold as data area for the image which moves dynamically, and the data transfer section transfers each pixel data in the block of the first field data held by the three field data holding section and determined as the data area of the image which moves dynamically by the determining section to the fourth field data holding section, the still image data generating section generates still image data by interlacing the first field data held by the third field data holding section and the second field data held by the fourth field data holding section.

According to the fourth aspect of the present invention, the first field data inputted by the moving object data input section immediately before the first field data held by the first field data holding section is inputted is held by the third field data holding section. The second field data to to be one frame data together with the first field data held by the third field data holding section is held by the fourth field data holding section. With the field data dividing section, the first filed data held by the first field holding section, the second field data held by the second field holding section, the first field data held by the third field holding section and the second filed data held by the fourth field holding section are respectively divided into blocks of a predetermined size. With the field difference value calculating section, an absolute value of a difference between each pixel data in the first field data held by the first field data holding section and each pixel data in the first field data held by the third field data holding section which are corresponded each other and an absolute value of a difference between each pixel data in the second field data held by the second field data holding section and each pixel data in the second field data held by the fourth field data holding section which are corresponded each other are respectively calculated, and a total of calculated results for each of the blocks is calculated. With the determining section, the block of which the absolute value total calculated by the field difference calculating section is larger than the predetermined threshold as data area for the image which moves dynamically is determined. With the data transfer section, each pixel data in the block of the first field data held by the third field data holding section and determined as the data area of the image which moves dynamically by the determining section is transferred to the fourth field data holding section.

In this way, each pixel data of the block in the first field data held by the third field data holding section and determined as the data area for the image which moves dynamically is transferred to the fourth field data holding section, therefore, it is possible to generate and code the still image data from the moving data so as to omit blurring of the image for an object which moves dynamically while the image of the object which moves slightly is kept clear.

The fifth aspect of the present invention is specified by that the moving image data is data in conformity to NTSC.

The sixth aspect of the present invention is specified by that the still image data coding section codes the still image data into data in conformity to JPEG.

The seventh aspect of the present invention is specified by that the still image data coding part codes the still image data into data in conformity to ITU-T Recommendation H.260 Annex-D.

According to the present invention, odd field data becomes equal to even field data in data for a image which moves dynamically, therefore, it is possible to generate and code the still image data from the moving data so as to omit blurring of the image for an object which moves dynamically while the image of the object which moves slightly is kept clear.

BRIEF DESCRIPTION OF THE DRAWINGS

Other objects and advantages of the present invention will become apparent during the following discussion conjunction with the accompanying drawings, in which.

DETAILED DESCRIPTION OF THE PREFERRED EMBODIMENTS

Preferred aspects and embodiments of the present invention will now be described with reference to the accompanying drawings.

<First Embodiment>

Figure 1:
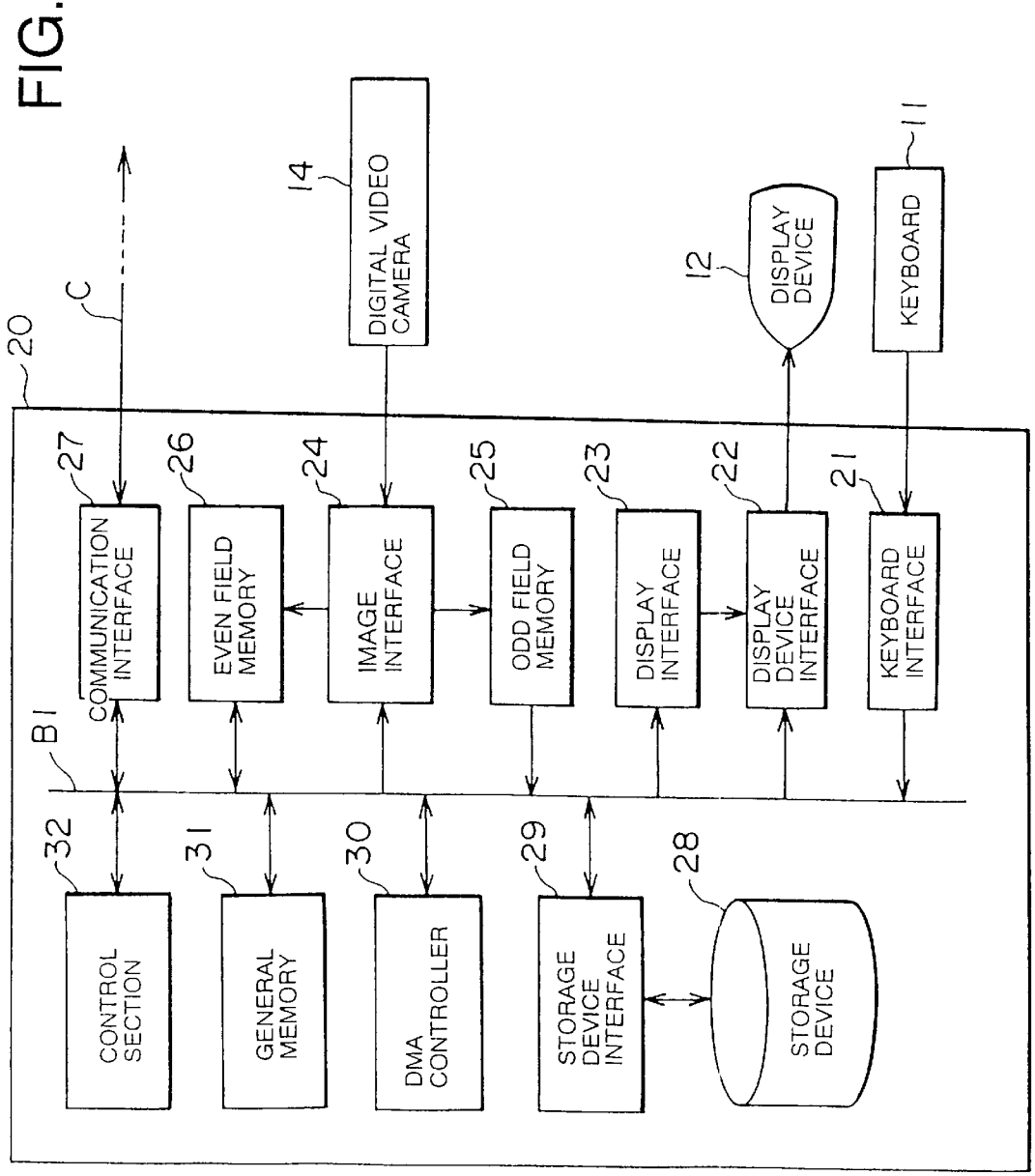
FIG. 1 is a block diagram illustrating a circuit structure of a still image encoder of the first embodiment according to the present invention.

FIG. 1 is a block diagram illustrating a still image encoder 10 of the first embodiment according to the present invention. In FIG. 1, the still image encoder 10 is provided with a keyboard 11, a display device 12, a digital video camera 14 and a computer 12.

The computer 20 is provided with a keyboard interface 21, a display device interface 22, a display memory 23, a image interface 24, an odd field memory 25, an even field memory 26, a communication interface 27, storage device interface 29, a DMA (Direct Memory Access) 30 and a general memory 31 connected one anther via a bus B1, a storage device 28 connected to the bus B1 via the storage device interface 29, and a control section 32.

The keyboard 11 is connected to the bus B1 via the keyboard interface 21. The display de vice 12 is connected to the bus B1 via the display device interface 22.

The digital video camera 14 and the image interface 24 are connected each other. The display device interface 22 and the display memory 23 are connected each other. The image interface 24 and the odd field memory 25 are connected each other. The image interface 24 and the even field memory 26 are connected each other.

The keyboard 11 is used by an operator to input data and various instructions to the computer 20. The display device 12 displays images, characters and the like based on processed results in the computer 20.

The digital video camera 14 obtains a moving image signal of the NTSC standard by taking images of a human, an object and the like and converts the moving image signal to moving image data digitalized in conformity to the ITU-R Recommendation BT.601 (CCIR Recommendation 601). The moving image data produced by the digital video camera 14 includes plural pieces of frame data according to time series.

The computer 20 executes a control program and so on. The keyboard interface 21 receives the data and the various instructions and transmits them to the bus B1. The display memory 23 is a RAM (Random Access Memory) or the like, and holds the image data to be displayed on the display device 12. The display device interface 22 displays a image based on character data, image data and the like held in the display memory 23.

The image interface 24, after turning on the main power of the still image encoder 10, receives frame data to be moving image data from the digital video camera 14 per 1/60 second which is a time interval between frames in moving image data of the NTSC standard. Then, the image interface 24 writes the odd field data thereof into the odd field memory 25 and the even field data thereof into the even field memory 26.

Figure 13:
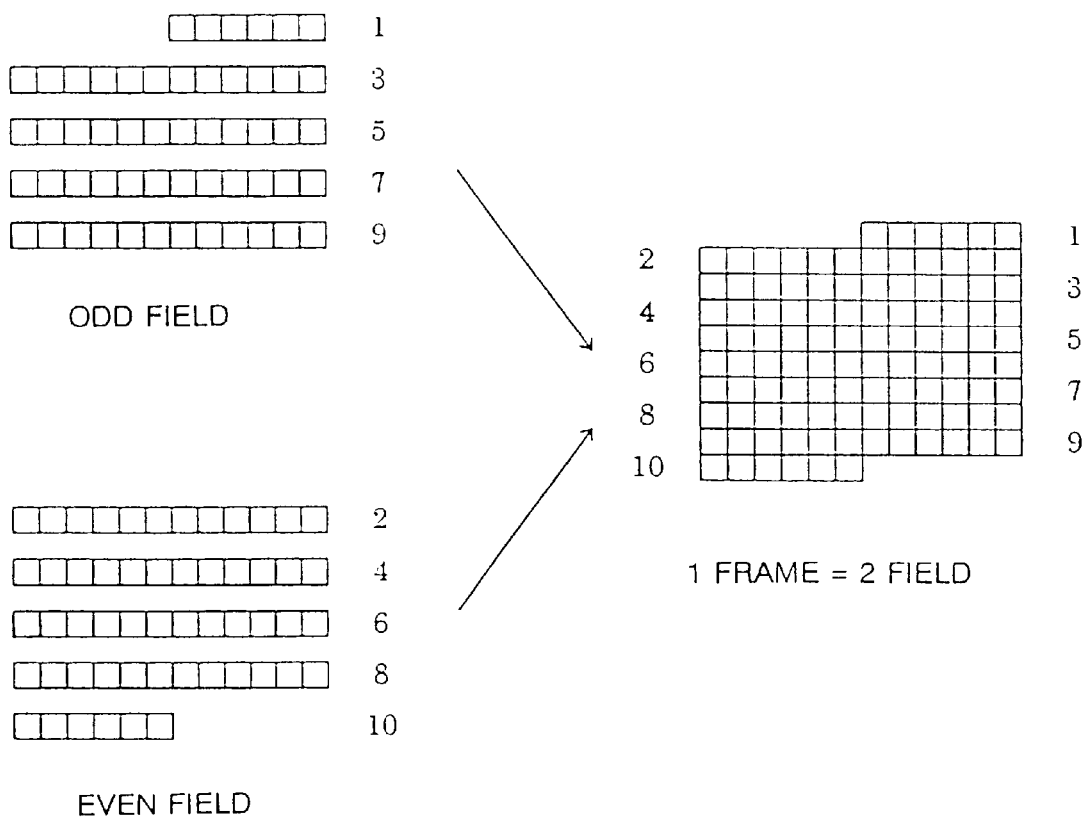
FIG. 13 is a concept view illustrating frame data structured by interlacing two pieces of field data.

Now, an explanation is given of a relation among the frame data, the odd field data and the even field data with reference to FIG. 13. FIG. 13 is a concept view illustrating a sample of frame data and field data included in the frame data.

In FIG. 13, the odd field data includes the first line consisting of 6 pixels and the third, fifth, seventh and ninth lines, each of which consists of 12 pixels. The even field data includes the second, fourth, sixth and eighth lines, each of which consists of 12 pixels and the tenth line consisting of 6 pixels.

The frame data is obtained by interlacing the odd field data and the even field data, and includes the first line consisting of 6 pixels, the second through ninth lines, each of which consists of 12 pixels, and the tenth line consisting of 6 pixels.

Actually, the odd field data to be frame data in the moving image data conforming to the ITU-R Recommendation BT.601 (CCIR Recommendation 601) includes the first line consisting of 360 pixels, the (2n+1) line consisting of 720 pixels ($1 \leq n \leq 262$; n=natural number). The even field data includes the (2n) line consisting of 720 pixels ($1 \leq n \leq 262$; n=natural number) and the 526th line consisting of 360 pixels.

The odd field memory 25 is a RAM or the like, and holds odd field data between two pieces of field data to be frame data. That is, the odd field memory 25 holds 240 lines of the effective area among 263 lines of odd field data (except for blank signal).

The odd field memory 25, for each pixel, separates the odd field data into three pieces of data including luminance data (Y data) and two pieces of chrominance data (U data and V data), and holds them respectively. The odd field data held in the odd field memory 25 is divided into blocks which are rectangular areas a by b. The first through 240th line numbers are given to the 240 lines of the odd field data held by the odd field memory 25. Then, each line is accessed by using the line number given in this way.

The even field memory 26 is a RAM or the like, and holds even filed data between the two pieces of filed memory to be frame data. That is, the 240 lines of effective area among the 263 lines of the even filed data (blank data).

The even field memory 26, for each pixel, separates the even field data into three pieces of data including luminance data (Y data) and two pieces of chrominance data (U data and V data), and holds them respectively. The even field data held in the even field memory 25 is divided into blocks which are rectangular areas a by b. The first through 240th line numbers are given to the 240 lines of the even field data held by the even field memory 25. Then, each line is accessed by using the line number given in this way.

The communication interface 27 transmits/receives data to/from another computer, a image receiving device or the like via the communication path C. The storage device 28 is a hard disk unit storing various control programs executed by the control section 32, JPEG data and the like. The storage device interface 29 writes/reads data into/from the storage device 28.

The DMA controller 30 reads data from the odd field memory 25 and writes the data into the even field memory 26 in accordance with an instruction from the control section 32. The general memory 31 is a RAM or the like and is used for work of the control section 32.

The control section 32 is a CPU or the like, and instructs the display device interface 22 to display a image, instructs the communication interface 27 to transmits data and instructs the DMA controller 30 to transfer data. The control section 32 also instructs the storage interface to write/read data into/from the storage device 28.

Further, the control section 32 receives input data from the keyboard 11 via the keyboard interface 21, receives reception data via the communication interface 27 and receives respectively field data from the odd filed memory 25 and the even filed memory 26. Further the control section 32 carries out a process of data as to characters inputted from the keyboard 11, a calculation process of difference values between field data received from the odd field memory 25 and the even field memory 26 and a process of image data to be displayed on the display device 12.

An explanation will be given of the operation on the assumption that an effective area for still image coding is 704 pixels ×240 lines among 720 pixels ×240 lines of the odd field data held in the odd field memory 25 and an effective area for still image coding is 704 pixels ×240 lines among 720 pixels ×240 lines of the odd field data held in the odd field memory 25.

<Operation of Still Image Encoder in First Embodiment>

Figure 2:
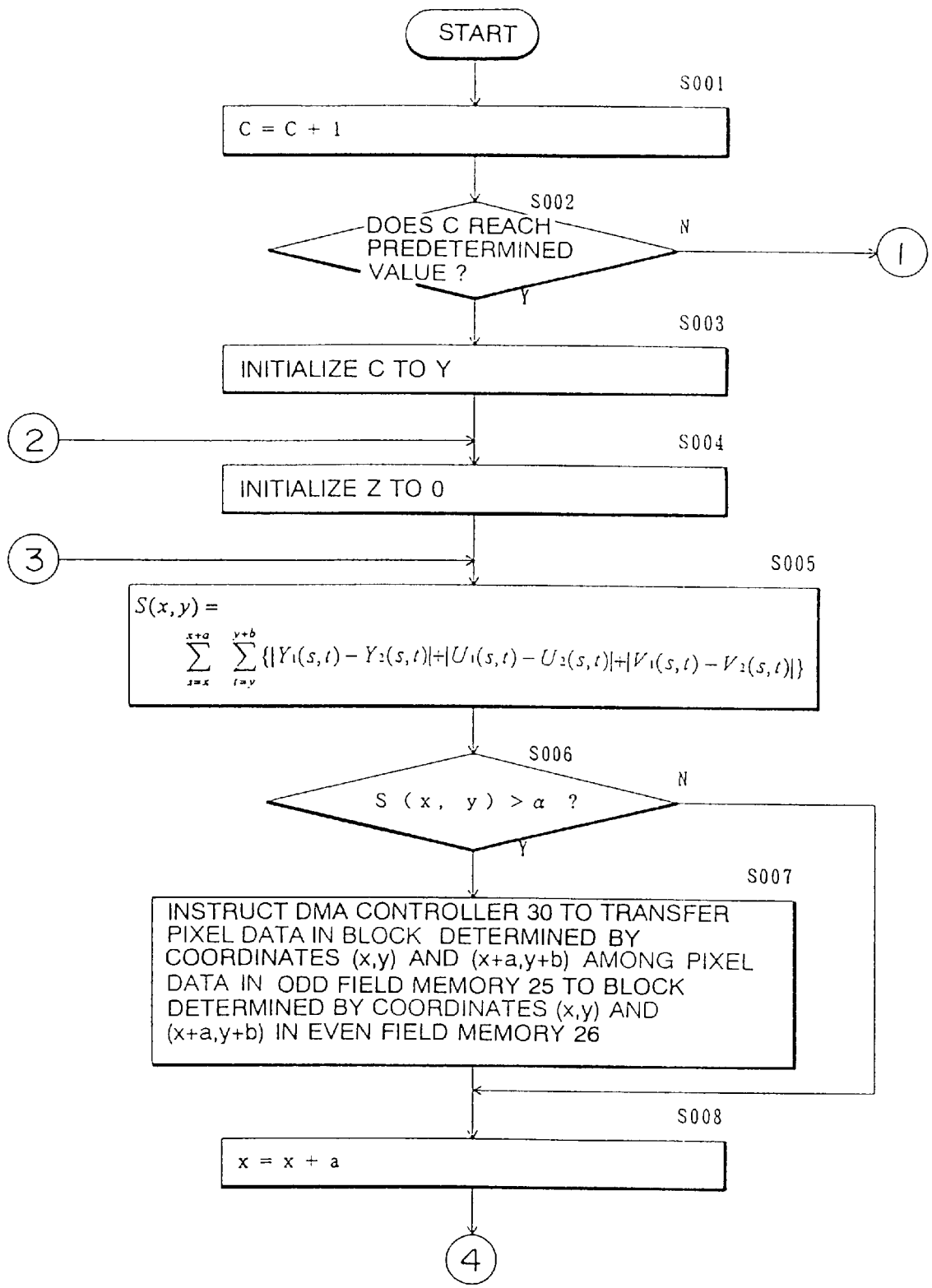
FIG. 2 is a flow chart illustrating a control process by the control section shown in FIG. 1.
Figure 3:
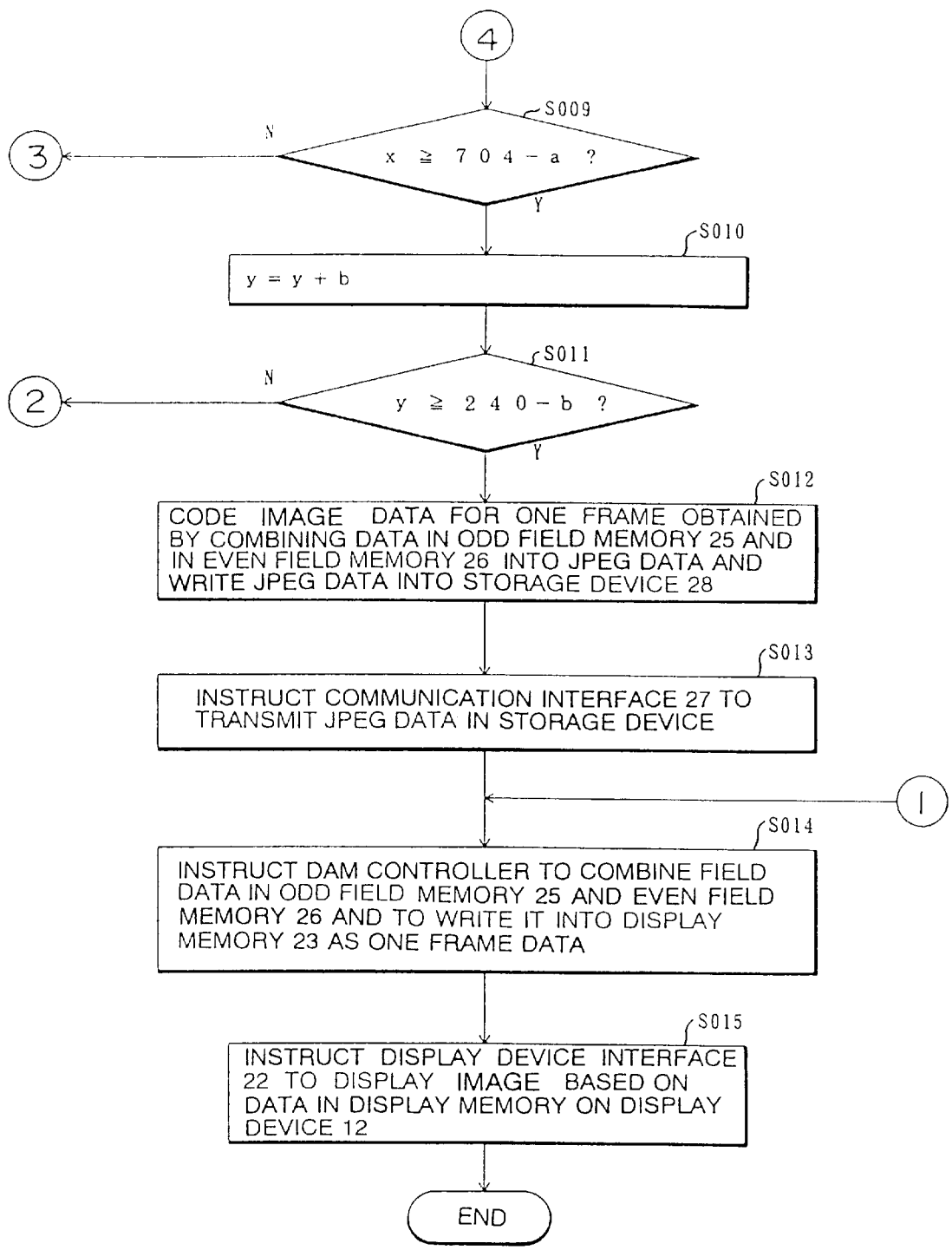
FIG. 3 is a flow chart illustrating a control process by the control section shown in FIG. 1.

Next, an explanation is given of control contests carried out by executing the control program stored in the storage device 28 by the control section 32 with reference to the flow charts shown in FIGS. 2 and 3.

The control section 32 in the still image encoder 10, after turning on the main power, executes the control process shown in FIGS. 2 and 3 per 1/60 second which is a time interval between frames in moving image data in conformity to NTSC.

When the process in FIGS. 2 and 3 starts, in the initial step S001, the control section 32 increases a variable C for measuring a frame data sampling timing from the moving image data. It is assumed that the variable C is set to 0 in the initialization process executed immediately after turning on the main power of the still image encoder 10. Then, the control section 32 advances the process to the step S002.

In the step S002, the control section 32 checks whether the variable C reaches a predetermined value or not, namely, whether the variable C is the frame data sampling timing or not. At that time, when the variable C reaches the predetermined value (S002; YES), the control section 32 advances the process to the step S003. On the contrary, when the variable C does not reaches the predetermined value, the control section 32 advances the process to the step S014.

In the step 003, the control section 32 initializes the variable C and a variable y and sets them as "0". Then, the control section 32 advances the process to the step S004.

When the control section 32 advances the process to the step S004, the control section 32 performs the loop process from the step S004 through the step S011. In the initial step S004 of this loop, the control section 32 initializes the variable x and sets as "0". Then, the control section 32 advances the process to the step S005.

Then, the control section 32 performs the loop process from the step S005 through the step S009. In the initial step S005, the control section 32 calculates the field difference value S (x,y) between the odd field data held in the odd field memory 25 and the even field data held in the even field memory 26 in accordance with the following expression (1) and advances the process to the step S006.

$$S(x, y) = \sum_{s=x}^{x+a} \sum_{t=y}^{y+b} \{|Y_1(s, t) - Y_2(s, t)| + |U_1(s, t) - U_2(s, t)| + |V_1(s, t) - V_2(s, t)|\}$$

where a shows the number of pixels of the block in the horizontal direction, and b shows the number of pixels of the block in the vertical direction. $Y_1(s,t)$ shows a value of Y data of the pixel corresponding to the coordinates (s,t) in the odd field memory 25, and $Y_2(s,t)$ shows a value of Y data of the pixel corresponding to the coordinates (s,t) in the even field memory 26. Similarly, $U_1(s,t)$ shows a value of U data of the pixel corresponding to the coordinates (s,t) in the odd field memory 25, and $U_2(s,t)$ shows a value of U data of the pixel corresponding to the coordinates (s,t) in the even field memory 26. $V_1(s,t)$ shows a value of V data of the pixel corresponding to the coordinates (s,t) in the odd field memory 25, and $V_2(s,t)$ shows a value of V data of the pixel corresponding to the coordinates (s,t) in the even field memory 26.

As to the coordinates of the pixels in the odd field memory 25, the horizontal direction of the odd field data held by the odd field memory 25 is indicated by the x-coordinate and the horizontal direction is indicated by the y-coordinate. Similarly, as to the coordinates of the pixels in the odd field memory 26, the horizontal direction of the odd field data held by the even field memory 26 is indicated by the x-coordinate and the horizontal direction is indicated by the y-coordinate.

In the step S006, the control section 32 checks whether the field difference value S (x,y) calculated in the step S005 is larger than the threshold a or not. At that time, when the control section 32 determines that field difference value S (x,y) is larger than the threshold α (S006;YES), the control section 32 advances the process to the step S007. On the contrary, when the control section 32 determines that field difference value S (x,y) is less than the threshold α(S006;NO), the control section 32 advances the process to the step S008.

The control section 32, when advances the process to the step S007, instructs the DMA controller 30 so that data of each pixel in the block determined by the coordinates of two points (x,y) and (x+a,y+b) is transferred to the block determined by the coordinates of two points (x,y) and (x+a,y+b). As a result, data of each pixel in the block determined by the coordinates of two points (x,y) and (x+a,y+b) is copied to the block determined by the coordinates of two points (x,y) and (x+a,y+b). Then, the control section 32 advances the process to the step S008.

The control section 32, when advances the process to the step S008, adds the number of the pixels in the vertical direction of the block to the variable. Then, the control section 32 advances the process to the step S009 shown in FIG. 3.

In the step S009, the control section 32 checks whether the value of the variable x is more than 704-a or not. The control section 32, when determines that the value of the variable x is not more than 704-a (S009; NO), returns the process to the step S005. On the contrary, when the value of the variable x becomes more than 704-a after repeating the loop process from S005 through S009, the control section 32 gets out of the loop process from S005 through S009 and advances the process to the step S010.

In the step S010, the control section 32 adds the number b of pixels in the vertical direction in the block to the variable y. Then, the control section 32 advances the process to the step S011.

In the step S011, the control section 32 checks whether the value of the variable y is more than 240-b or not. The control section 32, when determines that the value of the variable x is not more than 240-b (S011; NO), returns the process to the step S004. On the contrary, when the value of the variable y becomes more than 240-b after repeating the loop process from S004 through S011, the control section 32 gets out of the loop process from S004 through S011 and advances the process to the step S012.

In the step S012, the control section 32 interlaces the odd field data in the odd field data memory 25 with the even field data in the even field data memory 26 and generates frame data. Then, the control section 32 codes the generated frame data into JPEG data. Further, the control section 32 writes the generated JPEG data into the storage device 28. Then, the control section 32 advances the process to the step S013.

In the step S013, the control section 32 instructs the communication interface 27 to transmit the JPEG data generated in the step S012. Then, the control section 32 advances the process to the step S014.

In the step S014, the control section 32 instructs the DMA controller 39 to write the frame data including the odd field data in the odd field memory 25 and the even field data in the even field memory 26. Then, the control section 32 advances the process to the step S015.

In the step S015, the control section 32 gives an instruction to the display interface 22 to display a image based on the data held by the display memory 23 on the display screen of the display device 12. When the process in the step S015 is completed, the control section 32 terminates the process therein.

In this embodiment, moving data in conformity to NTSC is used, however, moving data in conformity to PAL (Phase Alternation by Line), SECAM (Sequential a Memoire Color Television System) or the like may be used alternatively.

In this embodiment, the control section 32 codes the frame data into the JPEG data, however, the control section 32 codes the frame data into data in conformity to ITU-T Recommendation H. 261 Annex-D or the like instead of the JPEG data.

In this embodiment, the control section 32 transfers the data in the block in the odd field memory 25 to the block in the even field memory 26, however, the control section 32 may transfer the data in the block in the even field memory 26 to the block in the even field memory 25.

In this embodiment, the DMA controller 30 transfers the data in the block in the odd field memory 25 to the block in the even field memory 26, however, the control section 32 may perform the transfer process instead of the DMA controller 30.

Moreover, in this embodiment, the computer 20 is provided with two memories including the odd field memory 25 and the even field memory 26, however, the computer 20 is provided with one memory holding two pieces of field data.

Figure 4:
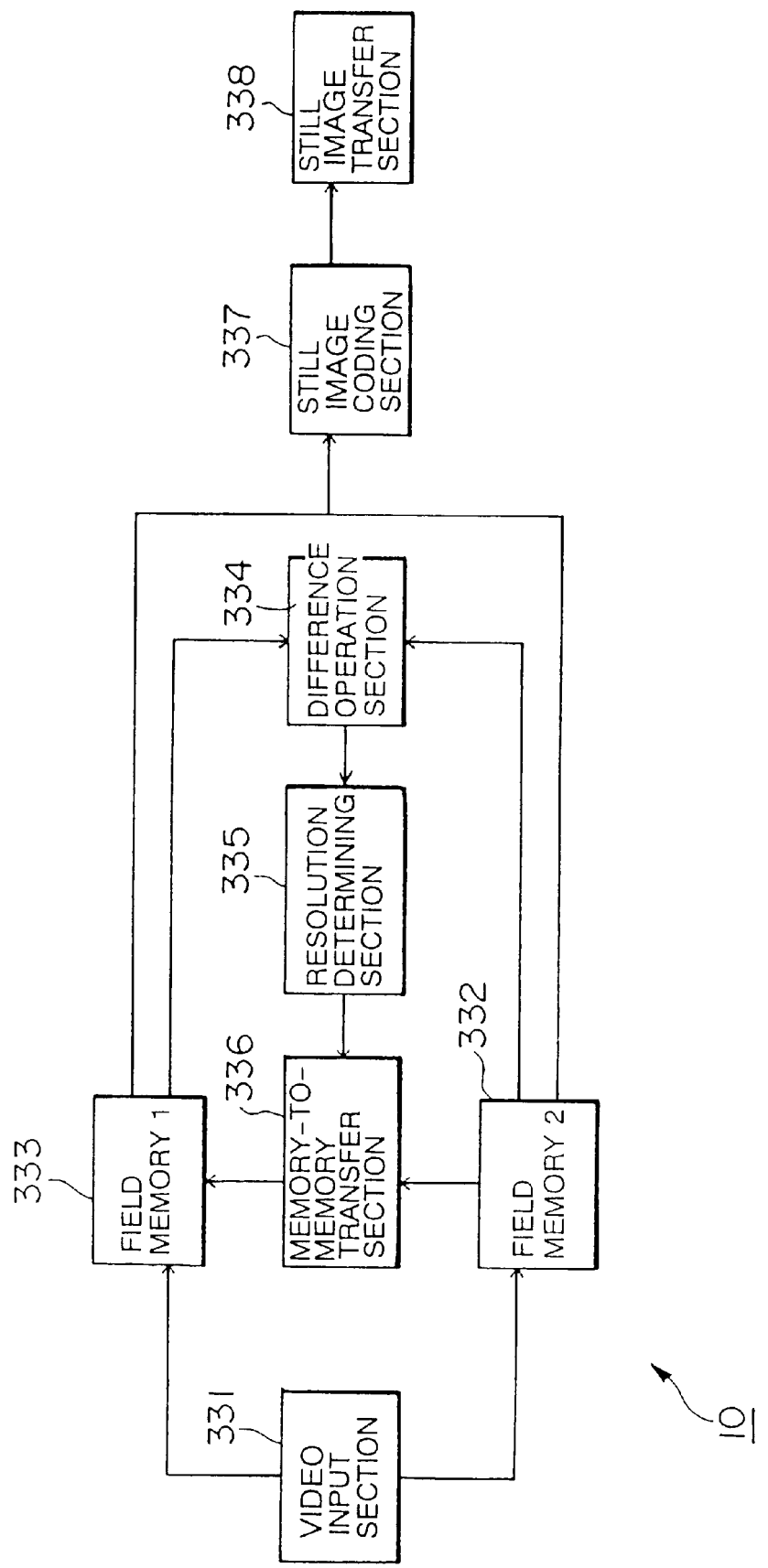
FIG. 4 is a concept view illustrating a still image encoder of the first embodiment.

FIG. 4 is a concept view illustrating a still image encoder of the first embodiment, in which each function is represented by a block. In FIG. 4, the still image encoder 10 is provided with an video input section 331 respectively connected to a first field memory 333 and a second field memory 332, the second field memory 332 respectively connected to a difference operation section 334, a memory-to-memory transfer section 336, and a still image coding section 337 and the first field memory 333 respectively connected to the difference operation section 334, the memory-to-memory transfer section 336, and the still image coding section 337. The still image encoder 10 is provided with the difference operation section 334 connected to a resolution determining section 335, the resolution determining section 335 connected to the memory-to-memory transfer section 336, the still image coding section 337, and the still image transfer section 338 connected to the still image coding section 337.

The video input section 331 functions similarly to the digital video camera 14 and the image interface 24 shown in FIG. 1. That is, the video input section 331 takes a image of an object or the like and converts it into moving data. Then, the video input section 331 writes the odd field data in the frame data to be moving data into the second field memory 332. Similarly, the video input section 331 writes the even field data into the first field memory 333.

The second field memory 332 functions similarly to the odd field memory 25 shown in FIG. 1. That is, the second field memory 332 holds the odd field data received from the video input section 331.

The first field memory 333 functions similarly to the even field memory 26 shown in FIG. 1. That is, the first field memory 333 holds the even field data received from the video input section 331.

The difference operation section 334 functions similarly to the control section 32 shown in FIG. 1. That is, the difference operation section 334 respectively reads data every block of a predetermined size from the second field memory 332 and the first field memory 333. Then, the difference operation section 334 calculates the field difference value S (x,y) of the read data in accordance with the expression (1). Then, the difference operation section 334 is ends the calculated field difference value S (x,y) to the resolution determining section 335.

The resolution determining section 335 functions similarly to the control section shown in FIG. 1. That is, the resolution determining section 335 determines whether the field difference value S (x,y) received from the difference operation section 334 is larger than the predetermine d threshold or not. When the field difference value S is larger than the threshold, the resolution determining section 335 instructs the memory-to-memory transfer section 336 to transfer data in the block to be determined in the second field memory 332 to the block to be determined in the first field memory 333.

The memory-to memory transfer section 336 functions similarly to the DMA controller 30 shown in FIG. 1. That is, the memory-to memory transfer section 336, when receives a transfer instruction from the resolution determining section 335, reads data from the block to be determined in the second field memory 332 and writes them into the block to be determined in the first field memory 333.

The still image coding section 337 functions similarly to the control section 32 shown in FIG. 1. That is, the still image coding section 337 codes frame data including filed data held by the second field memory 332 and the first field memory 333 into JPEG data and sends them to the still image transfer section 338.

The still image transfer section 338 functions similarly to the communication interface 27 shown in FIG. 1. That is, the still image transfer section 338 transmits the JPEG data coded by the still image coding section 337 to the another computer or the like.

According to the above-described still image encoder 10 of the first embodiment, the odd field data is equal to the even field data in the block of the object of dynamic movement. Thus, it is possible to generate and to code still image data in which a image of an object of dynamic movement is prevented to be blurred from the moving image data obtained by the digital camera 14, while an image of an object of slight movement is kept clear.

<Second Embodiment>

Next, an explanation is given of a still image encoder 10 of the second embodiment according to the present invention. The still image encoder 10 of the second embodiment supplements insufficiency in the still image encoder 10 of the first embodiment. Hereinafter, an explanation is given of the insufficiency in the still image encoder 10 of the first embodiment with reference to FIG. 7.

Figure 7:
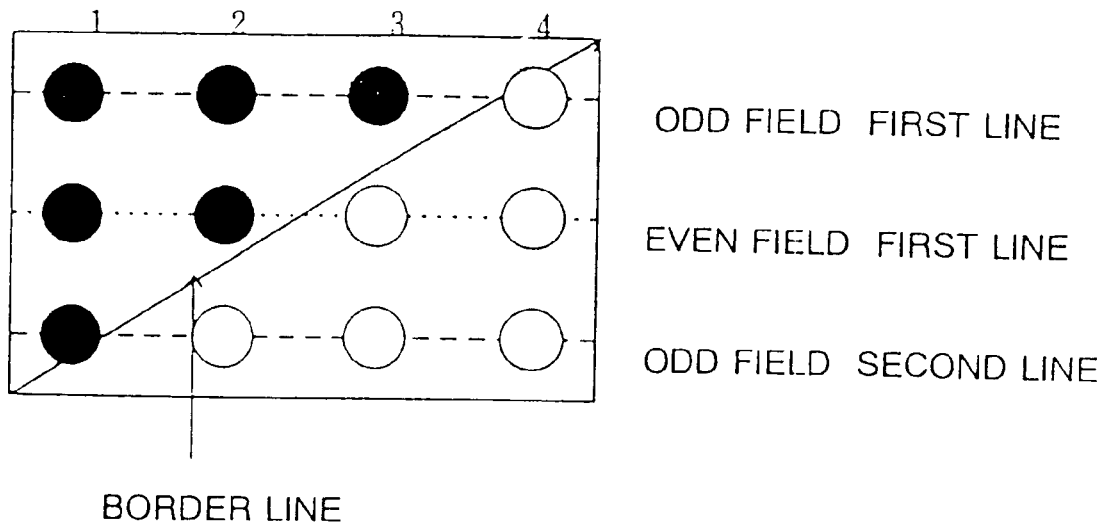
FIG. 7 is a concept view illustrating a sample of frame data.

FIG. 7 is a model view illustrating a part of frame data obtained by taking a still object. In FIG. 7, a black-painted circle indicates a pixel to be a image of a still black object. A white-painted circle indicates a pixel to be a white background. The field difference value S (s,t) obtained by applying the operation of the expression (1) to the data becomes very large, though the black object is still.

As a result, when the frame data shown in FIG. 7 is inputted to the still image encoder 10, there is a case that the field difference value S (s,t) exceeds the redetermined threshold $\alpha$. Then, data of each pixel on the first line in the odd field shown in FIG. 7 is transferred to the field memory area in which the first line of the even field is held.

Thus, when the frame data is inputted into the still image encoder of the first embodiment, the image quality degrades though the frame data is obtained by taking the image of the still object. The still image encoder 10 of the second embodiment is achieved in view of the above-mentioned problems.

The circuit structure of the still image encoder 10 of the second embodiment is similar to that of the still image encoder 10 of the first embodiment shown in FIG. 1.

<Operation of Still Image Encoder of Second Embodiment>

Figure 5:
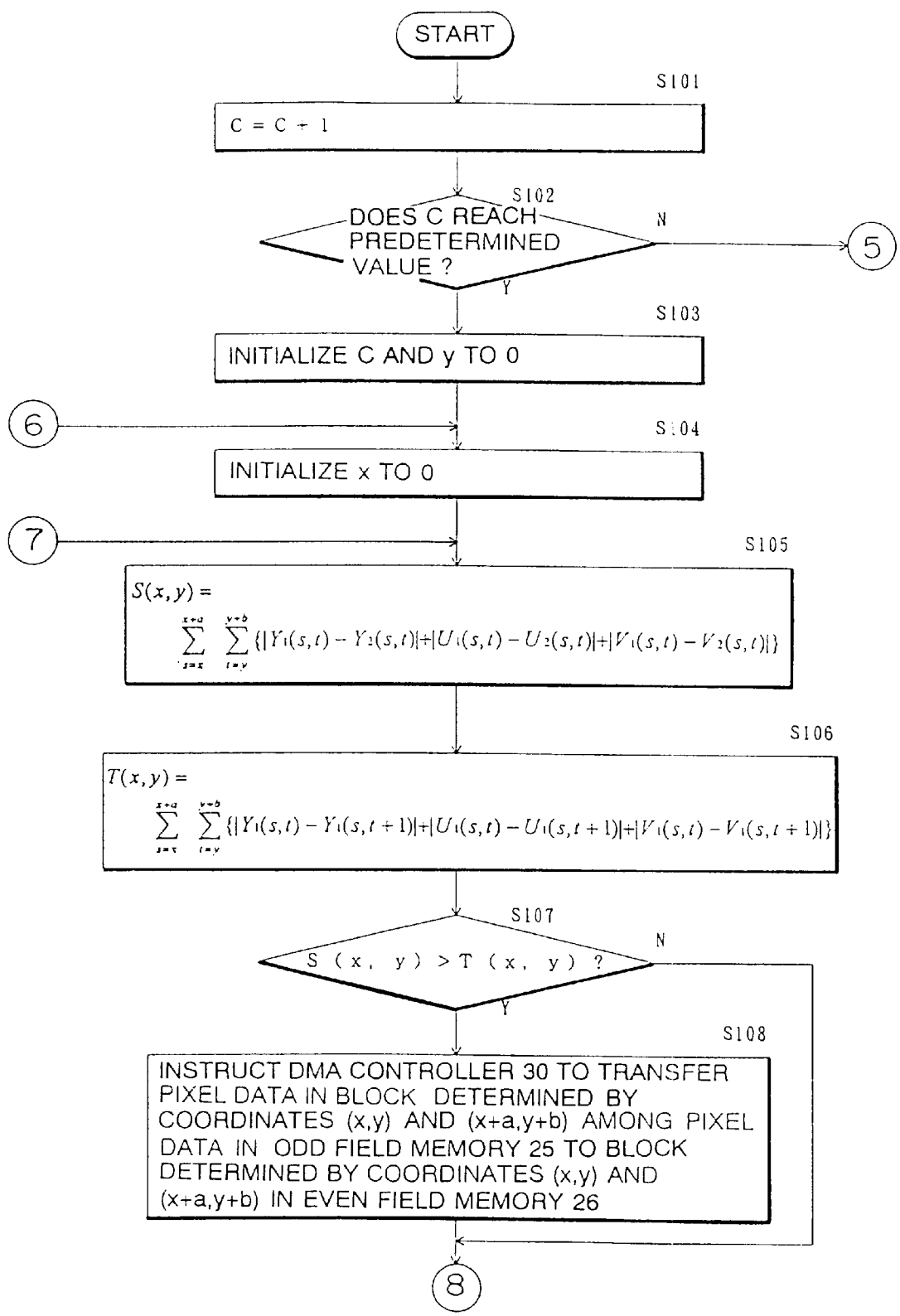
FIG. 5 is a flow chart illustrating a control process by the control section shown in FIG. 1.
Figure 6:
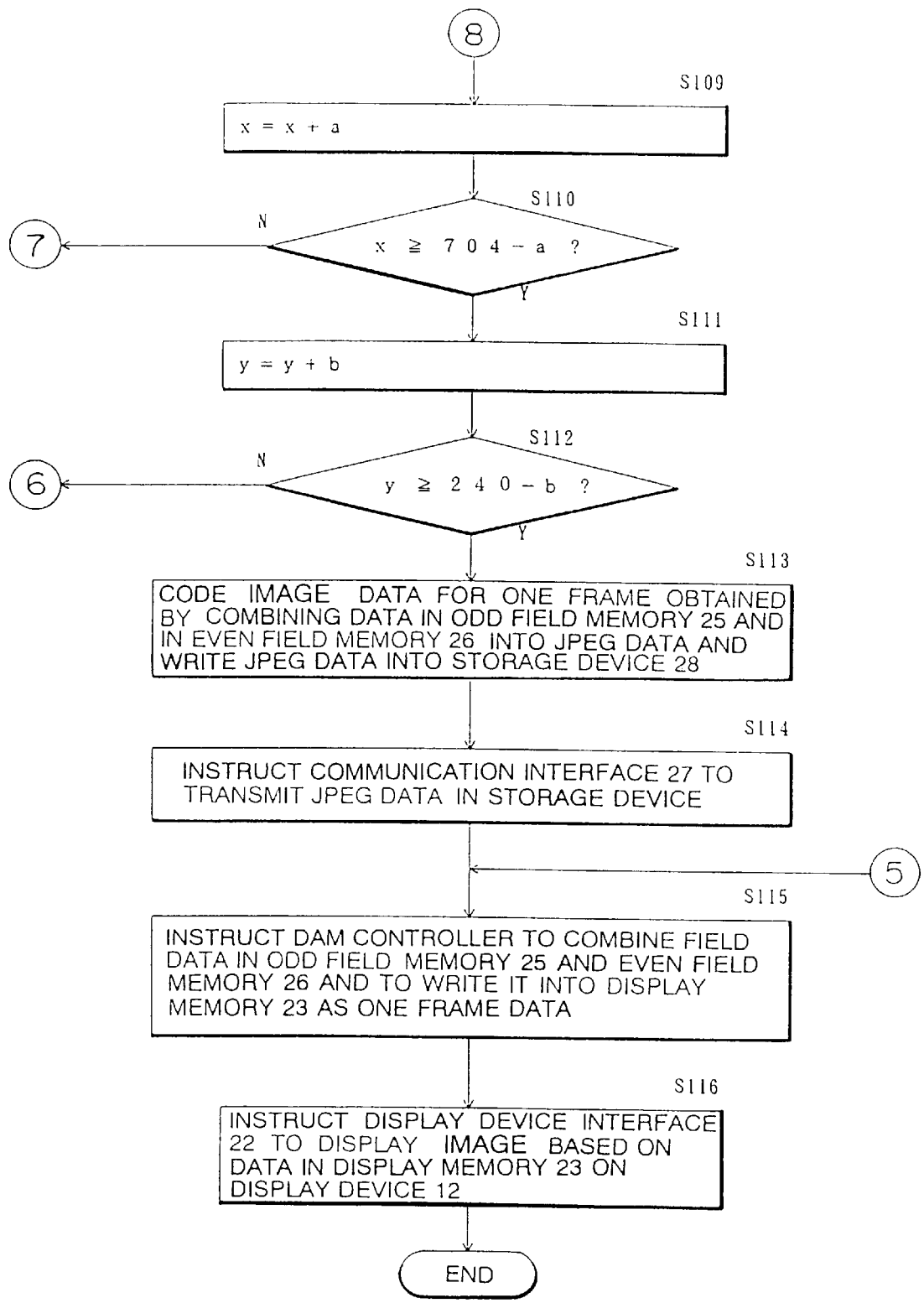
FIG. 6 is a flow chart illustrating a control process by the control section shown in FIG. 1.

Next, an explanation is given of the control contents carried out by executing the control program stored in the storage device 28 with the control section 32 with reference to the flow charts of FIGS. 5 and 6.

The control section 32 in the still image encoder 10, after turning on the main power, executes the control process shown in FIGS. 5 and 6 per 1/60 second which is a time interval between frames in the moving image data in conformity to NTSC.

When the process in FIGS. 5 and 6 starts, in the initial step S101, the control section 32 increases a variable C for measuring a frame data sampling timing from moving image data. The variable C is set to 0 in the initialization process executed immediately after turning the main power of the still image encoder 10. Then, the control section 32 advances the process to the step S102.

In the step S102, the control section 32 checks whether the variable C reaches the predetermined value or not, namely, whether the frame data is the sapling timing or not. At that time, when the variable C reaches the predetermined value (S102; YES), the control section 32 advances the process to the step S103. On the contrary, when the variable C does not reaches the predetermined value, the control section 32 advances the process to the step S115.

In the step 103, the control section 32 initializes the variable C and a variable y and sets them as "0". Then, the control section 32 advances the process to the loop process from the step S104 through the step 112.

In the initial step S105 of this loop, the control section 32 calculates the field difference value S (x,y) in accordance with the expression (1). Then, the control section 32 advances the process to the step S106.

In the step S106, the control section 32 calculates the in-field difference value T (x,y) in the odd field data held in the odd field memory 25 in accordance with the following expression (2) and advances the process to the step S107.

$$T(x, y) = \sum_{s=x}^{x+a} \sum_{t=y}^{y+b} \{|Y_1(s, t) - Y_1(s, t+1)| + |U_1(s, t) - U_1(s, t+1)| + |V_1(s, t) - V_1(s, t+1)|\}$$

where $Y_1$ (s,t) shows Y data of the pixel corresponding to the coordinates (s,t) in the odd field memory, and $Y_1$(s,t+1) shows Y data of the pixel corresponding to the coordinates (s,t+1) in the odd field memory 25, namely, Y data of the pixel positioning in a row next to the row of the coordinates (s,t) and in the column of the coordinates (s,t). $U_1$(s,t) shows U data of the pixel corresponding to the coordinates (s,t) in the odd field memory 25, and $U_1$(s,t+1) shows U data of the pixel corresponding to the coordinates (s,t+1) in the odd field memory 25. $V_1$(s,t) shows V data of the pixel corresponding to the coordinates (s,t) in the odd field memory 25, and $V_1$(s,t+1) shows U data of the pixel corresponding to the coordinates (s,t+1) in the odd field memory 25.

In the step S107, the control section 32 checks whether the field difference value S (x,y) calculated in the step S105 is larger than the in-field difference value T (x,y) calculated in the step S105 or not. At that time, when the control section 32 determines that field difference value S (x,y) is larger than the in-field difference value T (x,y) (S107;YES), the control section 32 advances the process to the step S108. On the contrary, when the control section 32 determines that field difference value S (x,y) is less than the in-field difference value T (S107;NO), the control section 32 advances the process to the step S108.

The control section 32, when advances the process to the step S108, instructs the DMA controller 30 so that data of each pixel in the block determined by the coordinates of two points (x,y) and (x+a,y+b) is transferred to the block determined by the coordinates of two points (x,y) and (x+a,y+b). As a result, data of each pixel in the block determined by the coordinates of two points (x,y) and (x+a,y+b) is copied to the block determined by the coordinates of two points (x,y) and (x+a,y+b) in the odd field memory 26. Then, the control section 32 advances the process to the step S109 shown in FIG. 6.

The control section 32, when advances the process to the step S008, adds the number of the pixels in the vertical direction of the block to the variable. Then, the control section 32 advances the process to the step S009 shown in FIG. 3.

In the step S109, the control section 32 adds the number a of pixels in the horizontal direction in the block to the variable x, and advances the process to the step S110.

In the step S110, the control section 32 checks whether the value of the variable x is more than 704-a or not. The control section 32, when determines that the value of the variable x is not more than 704-a (S0110; NO), returns the process to the step S105. On the contrary, when the value of the variable x becomes more than 704-a after repeating the loop process from S105 through S110, the control section 32 gets out of the loop process from S105 through S110 and advances the process to the step S110.

In the step S111, the control section 32 adds the number b of pixels in the vertical direction in the block to the variable y. Then, the control section 32 advances the process to the step S011.

In the step S112, the control section 32 checks whether the value of the variable y is more than 240-b or not. The control section 32, when determines that the value of the variable x is not more than 240-b (S112; NO), returns the process to the step S104. On the contrary, when the value of the variable y becomes more than 240-b after repeating the loop process from S104 through S112, the control section 32 gets out of the loop process from S104 through S112 and advances the process to the step S113.

In the step S113, the control section 32 generates frame data from the odd field data in the odd field data memory 25 and the even field data in the even field data memory 26. Then, the control section 32 codes the generated frame data into JPEG data. Further, the control section 32 writes the generated JPEG data into the storage device 28. Then, the control section 32 advances the process to the step S114.

In the step S114, the control section 32 instructs the communication interface 27 to transmit the JPEG data generated in the step S113. Then, the control section 32 advances the process to the step S115.

In the step S115, the control section 32 instructs the DMA controller 39 to write the frame data including the odd field data in the odd field memory 25 and the even field data in the even field memory 26 into the display memory 23. Then, the control section 32 advances the process to the step S116.

In the step S116, the control section 32 gives an instruction to the display interface 22 to display a image based on the data held by the display memory 23 on the display screen of the display device 12. When the process in the step S116 is completed, the control section 32 terminates the process therein.

An explanation is given of effects of the above-mentioned second embodiment with reference to FIG. 7. According to the still image encoder 10 of the second embodiment, the field difference value S (s,t) is compared not with the in-filed difference value T (s,t) calculated in accordance with the expression (2) but with the predetermined threshold α. The in-filed difference value T (s,t) is calculated in accordance with the difference between the first line in the odd field and the second line in the even field. Thus, the in-field difference value T (s,t) becomes larger than the filed difference value S (s,t). As a result, there is no case that data in the odd field is copied to the even field.

Further, the in-field difference value T (s,t) does not vary, even if a black object moves between the pick-up timing of the odd field and the pick-up timing of the even field. Thus, when S (s,t) >T (s,t), it is possible to determine that the black object moves.

As above described, according to the still image encoder 10 of the second embodiment, in addition to the same effects of the still image encoder 10 of the first embodiment, there is no case that the image of the object which moves slightly is determined as the image of the object which moves dynamically by mistake. Thus, it is possible to keep the image of the object which moves slightly clear.

<Third Embodiment>

Next, an explanation is given of a still image encoder 40 (See FIG. 8) of the third embodiment according to the present invention. The still image encoder 40 of the second embodiment supplements insufficiency in the still image encoder 10 of the first and second embodiments. Hereinafter, an explanation is given of the insufficiency in the still image encoder 10 of the first and second embodiments.

When frame data in which two-color lines are repeated alternately (for example, frame data in which black lines and white lines are repeated alternately) is inputted to the still image encoder 10 of the first and second embodiments, the field difference value S (s,t) obtained by performing the operation of the expression (1) by the control section 32 becomes very large. On the contrary, the in-field difference value T (s,t) obtained by performing the operation of the expression (1) by the control section 32 becomes small.

As a result, the above-mentioned frame data is inputted to the still image encoder 10 of the first and second embodiments, data of each pixel in the block of the odd field data is transferred to the block in the odd field data. Thus, in spite of frame data obtained by taking an image of an object which moves slightly, the image quality thereof degrades. The still image encoder 40 of the third embodiment is developed in view of the above-mentioned problems.

Figure 8:
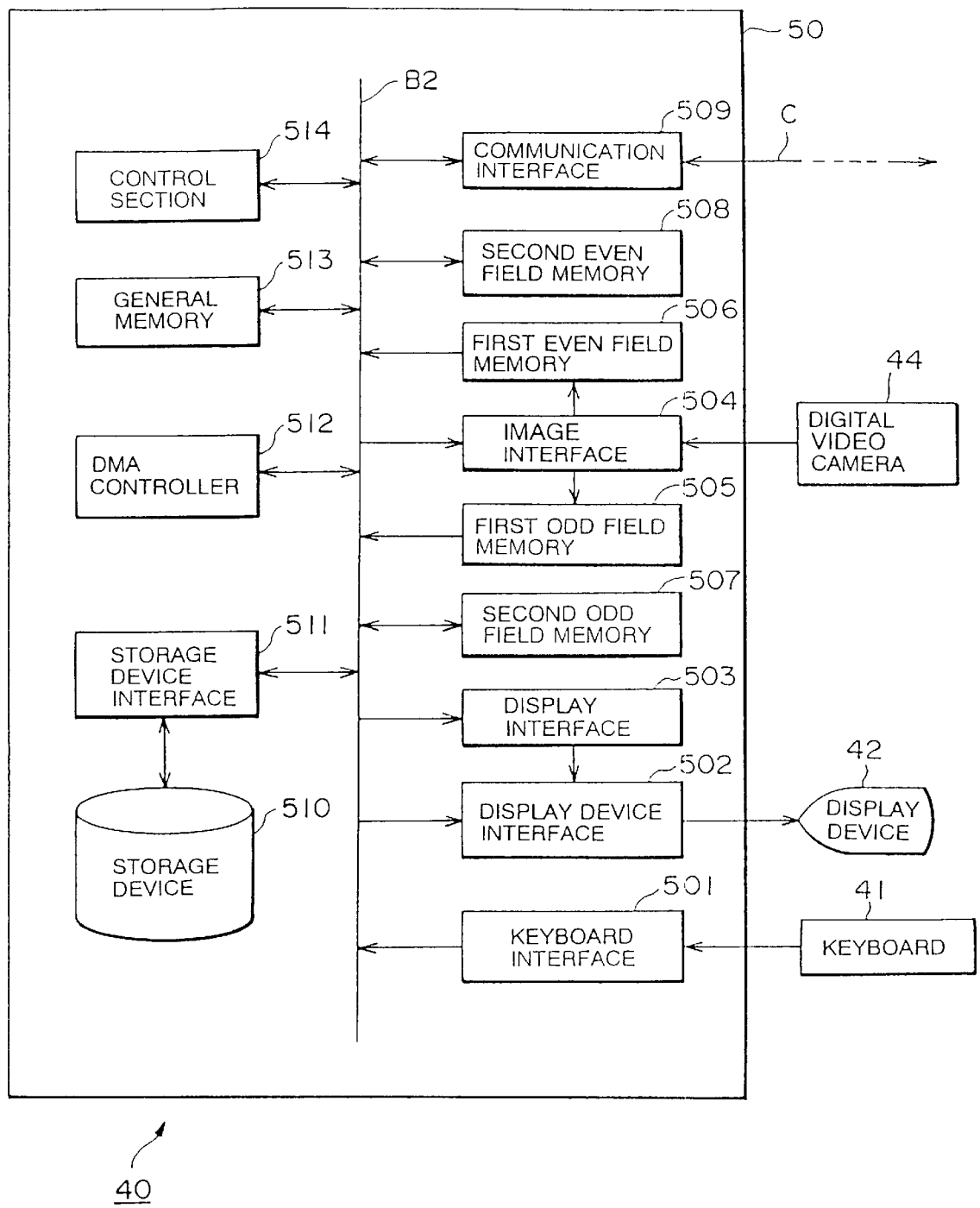
FIG. 8 is a block diagram illustrating a circuit structure of a still image encoder of the second embodiment.

Next, an explanation is given of the structure of the still image encoder 40 according to the third embodiment. FIG. 8 is a block diagram illustrating the still image encoder 40 of the third embodiment according to the present invention. In FIG. 8, the still image encoder 40 is provided with a keyboard 41, a display device 42, a digital camera 44 and a computer 50.

The computer 50 is provided with a keyboard interface 501, a display device interface 502, a display memory 503, a image interface 504, a first odd field memory 505, a first even field memory 506, a second odd field memory 507, a second even field memory 508, a communication interface 509, a storage device interface 511, a DMA controller 512, a general memory 513 and a control section 514 which are connected to a bus B2, and a storage device 510 connected to the bus B2 via the storage device interface 511.

The keyboard 41 is connected to the bus B2 via the keyboard interface 502, and the display device 42 is connected to the bus B2 via the display device interface 502. Further, the digital video camera 44 and the image interface 504 are connected each other, and the display device interface 502 and the display memory 503 are connected each other. The image interface 504 is connected to both of the first odd field memory 505 and the first even field memory 506.

The keyboard 41 is used by an operator to input data and various instructions to the computer 50. The display device 42 displays images, characters and the like based on processed results in the computer 50.

The digital video camera 44 obtains a moving image signal of the NTSC standard by taking images of a human, an object and the like and produces moving image data digitalized in conformity to the ITU-R Recommendation BT.601 (CCIR Recommendation 601).

The computer 50 executes a control program and so on. The keyboard interface 501 receives the data and the various instructions and transmits them to the bus B2. The display memory 503 is a RAM (Random Access Memory) or the like, and holds the image data to be displayed on the display device 42. The display device interface 502 displays a image based on character data, image data and the like held in the display memory 503.

The image interface 504, after turning on the main power of the still image encoder 40, receives frame data to be moving image data from the digital video camera 44 per 1/60 second which is a time interval between frames in moving image data of the NTSC standard. Then, the image interface 504 writes the odd field data thereof into the first odd filed memory 505 and the even field data thereof into the first even filed memory 506.

The first odd field memory 505 is a RAM or the like, and holds odd field data between two pieces of field data to be frame data. The first odd field memory 505 holds the effective area including 240 lines. Further, the odd field memory 505, for each pixel, separates the odd field data into three pieces of data including luminance data (Y data) and two pieces of chrominance data (U data and V data), and holds them respectively. The odd field data held in the first odd field memory 505 is divided into blocks which are rectangular areas a by b. The first through 240th line numbers are given to the 240 lines of the odd field data held by the first odd field memory 505. Then, each line is accessed by using the line number given in this way.

The first even field memory 506 is a RAM or the like and holds even filed data between the two pieces of filed memory to be frame data. The first even field memory 506 holds the effective area including 240 lines. Further, the first even field memory 506, for each pixel, separates the even field data into three pieces of data including luminance data (Y data) and two pieces of chrominance data (U data and V data), and holds them respectively. The even field data held in the even field memory 506 is divided into blocks which are rectangular areas a by b. The first through 240th line numbers are given to the 240 lines of the even field data held by the first even field memory 506. Then, each line is accessed by using the line number given in this way.

The second odd field memory 507 is similar to the first odd field memory 505. The odd field data which is held in the first odd field memory 505 till then is transferred to the second odd field memory 507 by the DMA controller 512, whenever new odd field data is written into the first odd field memory 505.

The second even field memory 508 is similar to the first even field memory 506. The even field data which is held in the first even field memory 506 till then is transferred to the second even field memory 507 by the DMA controller 512, whenever new even field data is written into the first even field memory 506.

The communication interface 509 transmits/receives data to/from another computer, a image receiving device or the like via the communication path C. The storage device 510 is a hard disk unit storing various control programs executed by the control section 514, JPEG data and the like. The storage device interface 511 writes/reads data into/from the storage device 510.

The DMA controller 512 transfers all data held in the first odd field memory 505 to the second odd field memory 507, or transfers all data held in the first even field memory 506 to the second even field memory 508. The DMA controller 512 reads data of specified blocks in the second odd field memory 507 and write them into specified blocks in the second even field memory 508. The general memory 513 is a RAM or the like and is used for work of the control section 32.

The control section 514 is a CPU or the like, and instructs the display device interface 502 to display a image, instructs the communication interface 509 to transmit data and instructs the communication interface 509 to transfer data. The control section 514 also instructs the storage interface 511 to write/read data into/from the storage device 510. Further, the control section 514 receives input data from the keyboard 11 via the keyboard interface 501, receives reception data via the communication interface 509 and receives respectively field data from the first odd filed memory 505, the first even filed memory 506, the second odd filed memory 507, and the first even filed memory 508. The control section 514 carries out a process of data as to characters inputted from the keyboard 41, a calculation process of difference values between filed data received from the first odd field memory 505, the first even field memory 506, the second odd field memory 507, the first even field memory 508, and a process of image data to be displayed on the display device 42.

<Operation of Still Image Encoder in Third Embodiment>

Figure 9:
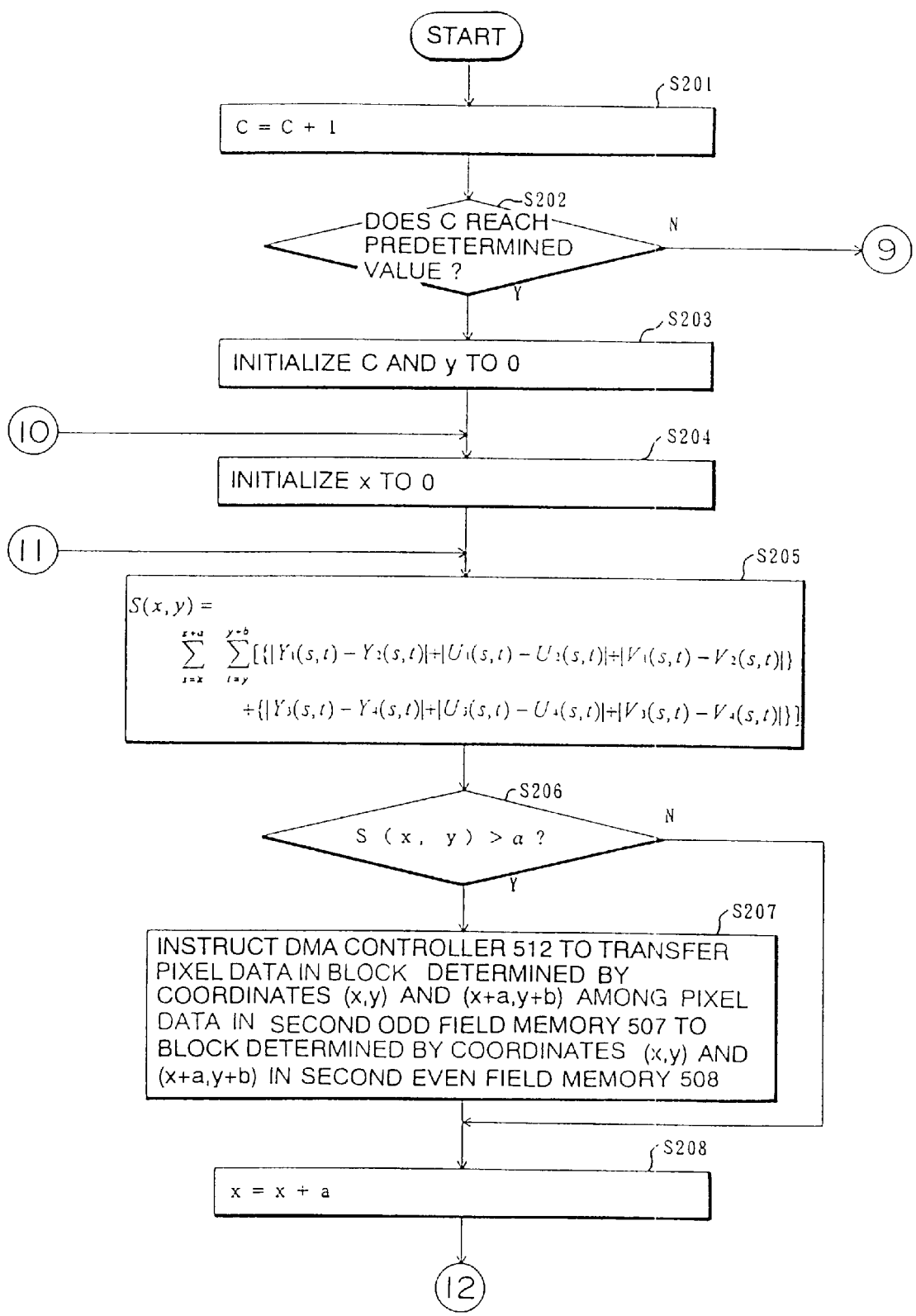
FIG. 9 is a flow chart illustrating a control process by the control section shown in FIG. 8.
Figure 10:
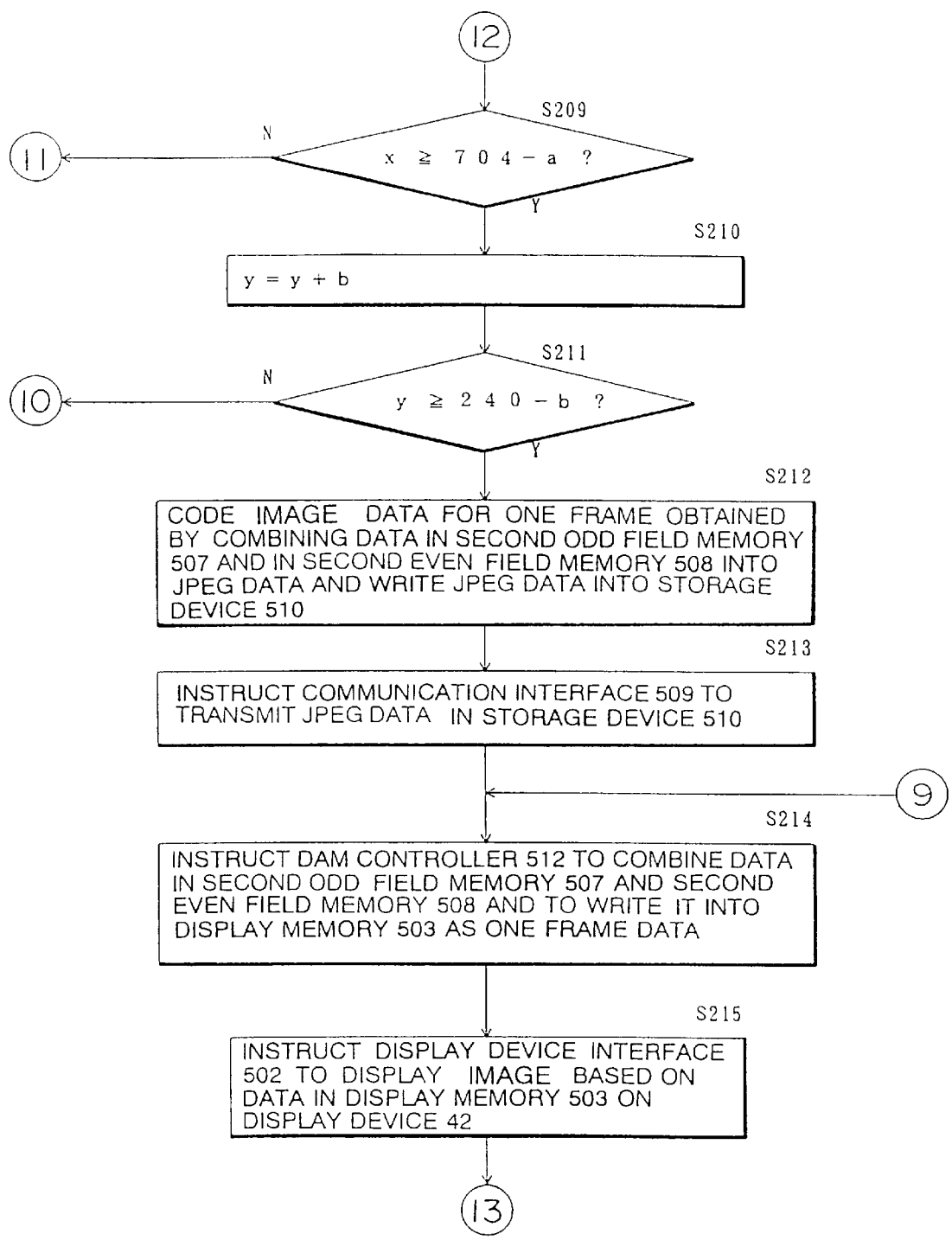
FIG. 10 is a flow chart illustrating a control process by the control section shown in FIG. 8.
Figure 11:
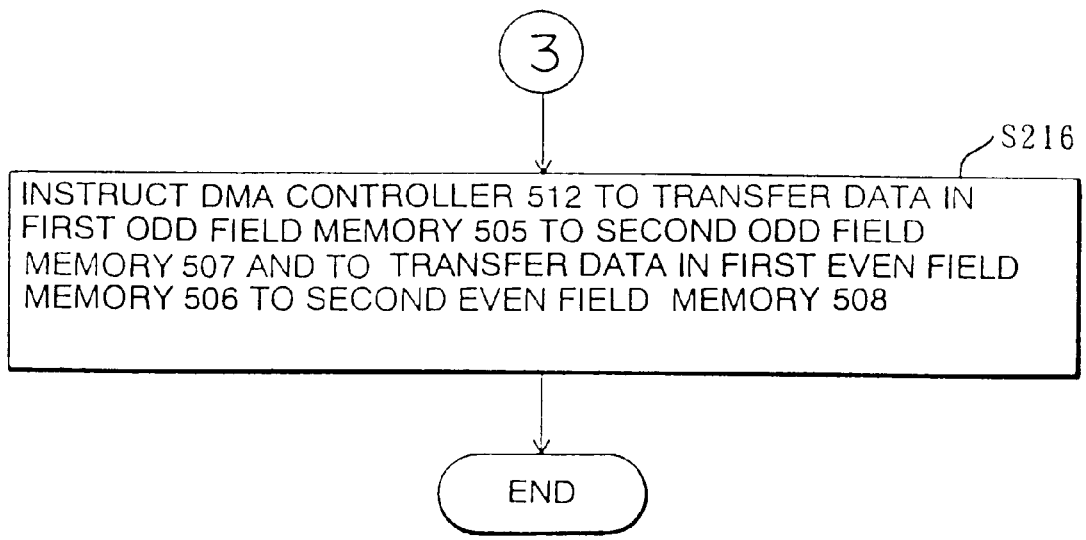
FIG. 11 is a flow chart illustrating a control process by the control section shown in FIG. 8.

Next, an explanation is given of control contests carried out by executing the control program stored in the storage device 510 by the control section 514 with reference to the flow charts shown in FIGS. 9 through 11.

The control section 514 in the still image encoder 40, after turning on the main power, executes the control process shown in FIGS. 9 through 11 per 1/60 second which is a time interval between frames in moving image data in conformity to NTSC.

When the process in FIGS. 2 and 3 starts, in the initial step S201, the control section 514 increases a variable C for measuring a frame data sampling timing from the moving image data. It is assumed that the variable C is set to 0 in the initialization process executed immediately after turning on the main power of the still image encoder 40. Then, the control section 514 advances the process to the step S202.

In the step S202, the control section 514 checks whether the variable C reaches a predetermined value or not, namely, whether the variable C is the frame data sampling timing or not. At that time, when the variable C reaches the predetermined value (S202; YES), the control section 514 advances the process to the step S203. On the contrary, when the variable C does not reaches the predetermined value (S202; NO), the control section 514 advances the process to the step S214.

In the step S203, the control section 514 initializes the variable C and a variable y and sets them as "0". Then, the control section 514 advances the process to the step S204.

The control section 514, when advances the process to the step S204, performs the loop process from the step S204 through the step S211. In the initial step S204 of this loop, the control section 514 initializes the variable x and sets as "0". Then, the control section 514 advances the process to the step S205.

Then, the control section 514 performs the loop process from the step S205 through the step S209. In the initial step S205, the control section 514 calculates the field difference value S (x,y) between the frame data including field data held in the first odd field memory 505 and in the first even field memory 506 and frame data including field data held in the second odd field memory 507 and in the second even field memory 508 in accordance with the following expression (3). Then, the control section 514 advances the process to the step S206.

$$S(x, y) = \sum_{s=x}^{x+a} \sum_{t=y}^{y+b} \{|Y_1(s, t) - Y_2(s, t)| + |U_1(s, t) - U_2(s, t)| + |V_1(s, t) - V_2(s, t)|\} +$$

$$\{(|Y_3(s, t) - Y_4(s, t)| + |U_3(s, t) - U_4(s, t)| + |V_3(s, t) - V_4(s, t)|\}$$

where $Y_1(s,t)$ shows Y data of a pixel corresponding to coordinates (s,t) of in the second odd field memory 507, Y2 (s,t) shows a value of Y data of the pixel corresponding to the coordinates (s,t) in the first odd field memory 505, $Y_3(s,t)$ shows Y data of a pixel corresponding to coordinates (s,t) of in the second even field memory 508, and $Y_4(s,t)$ shows a value of Y data of the pixel corresponding to the coordinates (s,t) in the first even field memory 506.

Similarly, as to the expression (3), $U_1(s,t)$ shows U data of the pixel corresponding to the coordinates (s,t) in the second odd field memory 507, $U_2(s,t)$ shows U data of the pixel corresponding to the coordinates (s,t) in the first odd field memory 505, $U_3(s,t)$ shows U data of the pixel corresponding to the coordinates (s,t) in the second even field memory 508, $U_4(s,t)$ shows U data of the pixel corresponding to the coordinates (s,t) in the first even field memory 506. $V_1$ (s,t) shows V data of the pixel corresponding to the coordinates (s,t) in the second odd field memory 507, $V_2$ (s,t) shows V data of the pixel corresponding to the coordinates (s,t) in the first odd field memory 505, $V_3$ (s,t) shows V data of the pixel corresponding to the coordinates (s,t) in the second even field memory 508, $V_4(s,t)$ shows V data of the pixel corresponding to the coordinates (s,t) in the first even field memory 506.

In the step S206, the control section 514 checks whether the field difference value S (x,y) calculated in the step S205 is larger than the threshold a or not. At that time, the control section 514, when determines that the field difference value S (x,y) is larger than the threshold α (S206;YES), advances the process to the step S207. On the contrary, the control section 32, when determines that field difference value S (x,y) is less than the threshold α (S206;NO), advances the process to the step S208.

The control section 514, when advances the process to the step S207, instructs the DMA controller 30 so that data of each pixel in the block determined by the coordinates of two points (x,y) and (x+a,y+b) is transferred to the block determined by the coordinates of two points (x,y) and (x+a,y+b).

As a result, data of each pixel in the block determined by the coordinates of two points (x,y) and (x+a,y+b) is copied to the block determined by the coordinates of two points (x,y) and (x+a,y+b). Then, the control section 514 advances the process to the step S208.

In the step S208, the control section 514 adds the number a of the pixels in the horizontal direction of the block to the variable x, and then advances the process to the step S209.

In the step S209, the control section 514 checks whether the variable x is more than 704-a or not. The control section 32, when determines that the variable x is not more than 704-a (S209; NO), returns the process to the step S205. On the contrary, when the variable x becomes more than 704-a after repeating the loop process from S205 through S209, the control section 514 gets out of the loop process from S205 through S209 and advances the process to the step S210.

In the step S210, the control section 514 adds the number b of pixels in the vertical direction in the block to the variable y, and then advances the process to the step S211.

In the step S211, the control section 514 checks whether the variable y is more than 240-b or not. The control section 514, when determines that the variable x is not more than 240-b (S211; NO), returns the process to the step S204. On the contrary, when the variable y becomes more than 240-b (S211; YES) after repeating the loop process from S204 through S211, the control section 514 gets out of the loop process from S204 through S211 and advances the process to the step S212.

In the step S212, the control section 514 codes still image data which is frame data for one frame including the odd field data in the second odd field data memory 507 and the even field data in the second even field data memory 508 into JPEG data. Then, the control section 514 writes the generated JPEG data into the storage device 510. Thereafter, the control section 514 advances the process to the step S213.

In the step S213, the control section 514 instructs the communication interface 509 to transmit the JPEG data stored in the storage device 510. Then, the control section 514 advances the process to the step S214.

In the step S214, the control section 514 instructs the DMA controller 39 to write the frame data including the odd field data in the second odd field memory 507 and the even field data in the second even field memory 508 into the display memory 503. As a result, the frame data including the odd field data in the second odd field memory 507 and the even field data in the second even field memory 508 is written into the display memory 503. Then, the control section 32 advances the process to the step S215.

In the step S215, the control section 514 gives an instruction to the display interface 502 to display a image based on the data held in the display memory 503 on the display screen of the display device 42. Then, the control section 514 advances the process to the step S216.

In the step S216, the control section 514 instructs the DMA controller 512 to transfer all data in the first odd field memory 505 to the second odd field memory 507. Then, the control section 514 instructs the DMA controller 512 to transfer all data in the first even field memory 506 to the second even field memory 508. As a result, all data in the first odd field memory 505 is copied to the second odd field memory 507, and all data in the first even field memory 506 is copied to the second even field memory 508. When the process of the step S216 is completed, the control section 514 terminates the process therein.

Figure 12:
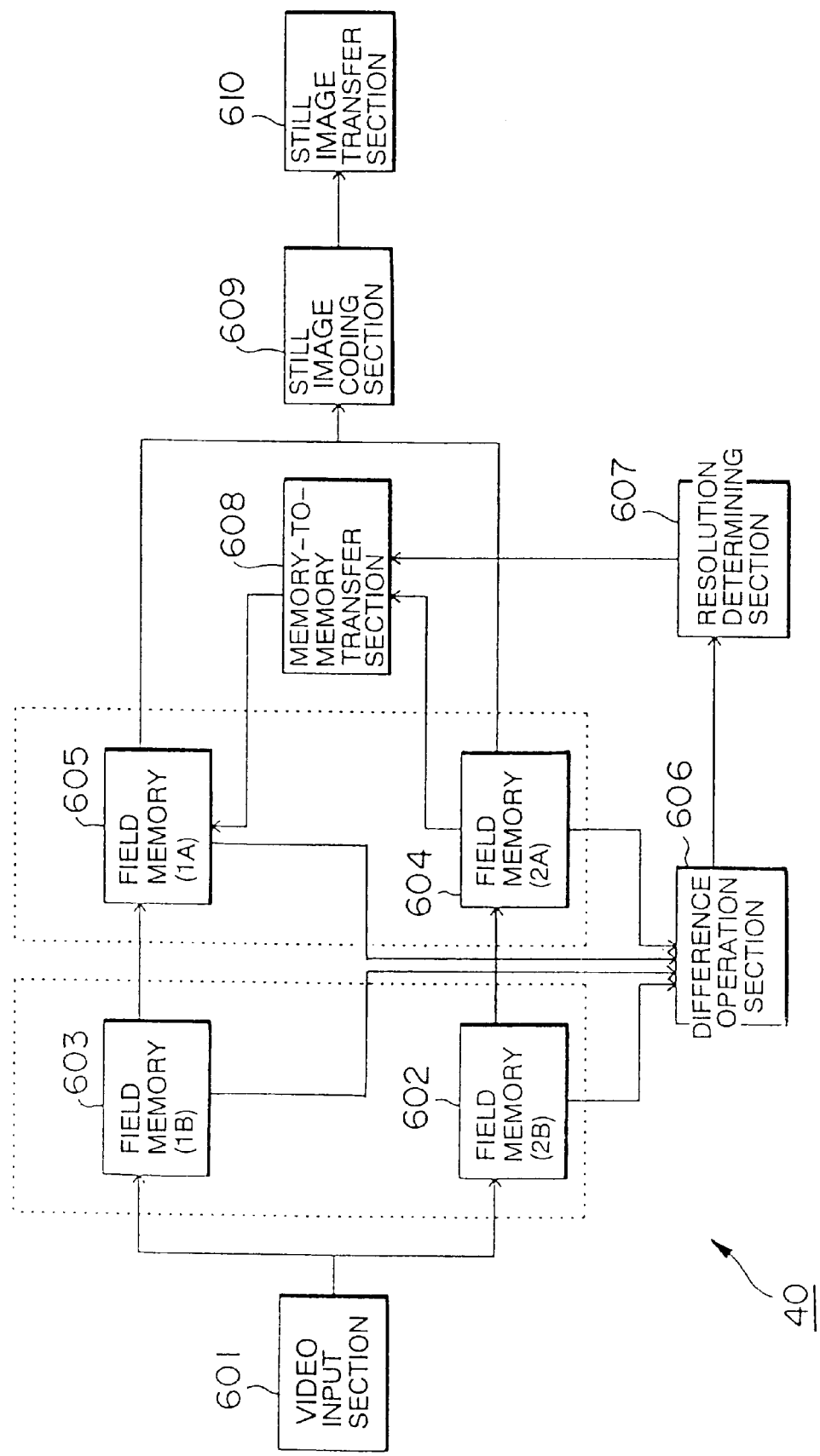
FIG. 12 is a block diagram illustrating a circuit structure of a still image encoder of the second embodiment.

FIG. 12 is a concept view illustrating a still image encoder 40 of the third embodiment, in which each function is represented by a block. In FIG. 12, the still image encoder 40 is provided with an video input section 601 respectively connected to a first field memory 602 and a second field memory 603, the first field memory 602 respectively connected to a third field memory 604 and a difference operation section 606, the second field memory 603 respectively connected to a fourth field memory 605 and the difference operation section 606, and the third field memory 604 connected to the difference operation section 606, a memory-to-memory transfer section 608 and a still image coding section 609.

The still image encoder 40 is provided with the fourth field memory 605 respectively connected to the difference operation section 606, the memory-to-memory transfer section 608 and the still image coding section 609, the difference operation section 606 connected to a resolution determining section 607, the resolution determining section 607 connected to the memory-to-memory transfer section 608, the still image coding section 609 connected to the still image transfer section 610, and the still image transfer section 610.

The video input section 601 functions similarly to the digital video camera 14 and the image interface 508 shown in FIG. 8. That is, the video input section 601 takes a image of an object or the like. Then, the video input section 601 writes the odd field data in the received frame data into the field memory (2B) 602. Similarly, the video input section 601 writes the even field data among the received frame data into the field memory (1B) 603.

The first field memory 602 functions similarly to the first odd field memory 505 shown in FIG. 8. The second field memory 603 functions similarly to the first even field memory 506 shown in FIG. 8. The third field memory 604 functions similarly to the second odd field memory 507 shown in FIG. 8. The fourth field memory 605 functions similarly to the second even field memory 508 shown in FIG. 8.

The difference operation section 606 functions similarly to the control section 514 shown in FIG. 1. That is, the difference operation section 606 calculates the field difference value between frame data including odd field data held in the first field memory 602 and even field data held in the second field memory 603 and frame data including odd field data held in the third field memory 604 and even field data held in the fourth field memory 605 in accordance with the expression (1) every block of a predetermined size.

The resolution determining section 607 functions similarly to the control section 514 shown in FIG. 8. That is, the resolution determining section 607 receives a frame difference value and compares it with a predetermined threshold, and then determines whether the image data in the block is the image data of the object which moves dynamically or not.

The memory-to-memory transfer section 608 functions similarly to the DMA controller 512 shown in FIG. 8. That is, the memory-to memory transfer section 608 receives the determined result from the resolution determining section 607, reads data of the block in the third field memory 604 and transfers them to the block in the fourth field memory 605.

The still image coding section 609 functions similarly to the control section 514 shown in FIG. 8. That is, the still image coding section 609 codes frame data including odd field data held by the third field memory 604 and even field data held by the fourth field memory 605 into JPEG data.

The still image transfer section 610 functions to transmit the JPEG data coded by the still image coding section 609 to the another computer or the like, similarly to the communication interface 509 shown in FIG. 8.

According to the still image encoder 40 of the third embodiment, the frame difference value S (s,t) is calculated by the expression (3), and is compared with the predetermined threshold $\alpha$. Thus, there is no variation based on time, though frame data in which white lines and black lines are repeated alternatively is inputted. That is, when there is no difference between frame data, the frame difference value S (s,t) becomes small, therefore, there is no case that odd field data is copied to even field data.

According to the still image encoder 40 of the third embodiment, in addition to the same effects of the still image encoder 10 of the first or second embodiment, there is no case that the image of the object which moves slightly is determined as the image of the object which moves dynamically by mistake, though frame data in which two color lines are repeated alternatively is inputted. Thus, it is possible to keep the image of the object which moves slightly clear.

This invention being thus described, it will be obvious that same may be varied in various ways. Such variations are not to be regarded as departure from the spirit and scope of the invention, and all such modifications would be obvious for one skilled in the art intended to be included within the scope of the following claims.

What is claimed is:

1. A still image encoder comprising:

moving image data input means for inputting moving data consisting of frame data in which first field data and second field data are interlaced;

first field data holding means for holding the first field data;

second field data holding means for holding the second field data to be one frame data together with the first field data held by the first field data holding means;

moving object area detecting means for detecting data area for a image which moves dynamically among frame data consisting of the first field data held by the first field data holding means and the first field data held by the second field data holding means;

data transfer means for extracting data in the data area in the first field data held by the first field data holding means and for transferring the data to the second field data holding means;

still image data generating means for generating still image data by interlacing the first field data held by the first field data holding means and the second field data held by the second field data holding means; and still image data coding means for coding the still image data.

2. A still image encoder according to the claim 1:

wherein said moving object area detecting means comprises field data dividing means for respectively dividing the first filed data held by the first field holding means and the second filed data held by the second field holding means into blocks of a predetermined size, field difference value calculating means for calculating an absolute value total of differences between each pixel data in the first field data and each pixel data in the second field data which are corresponded each other for each of the blocks, and determining means for determining the block of which the absolute value total calculated by the field difference calculating means is larger than the predetermined threshold as data area for the image which moves dynamically, and said data transfer means transfer each pixel data in the block of the first field data determined as the data area of the image which moves dynamically by the determining means.

3. A still image encoder according to the claim 1:

wherein said moving object area detecting means comprises field data dividing means for respectively dividing the first filed data held by the first field holding means and the second filed data held by the second field holding means into blocks of a predetermined size, field difference value calculating means for calculating an absolute value total of differences between each pixel data in the first field data and each pixel data in the second field data which are corresponded each other for each of the blocks, in-field difference calculating means for calculating, for each pixel data in the first field data, an absolute value of a difference between the pixel data and a pixel data in a row next to a row of the pixel data and in a column equal to a column of the pixel data, and for calculating a total of calculated results for each of the blocks, and determining means for determining the block of which the absolute value total calculated by the field difference calculating means is larger than the predetermined threshold as data area for the image which moves dynamically, and said data transfer means transfer each pixel data in the block of the first field data determined as the data area of the image which moves dynamically by the determining means to the second field data holding means.

4. A still image encoder according to the claim 1 further comprising:

third field data holding means for holding the first field data inputted by the moving object data input means immediately before the first field data held by the first field data holding means is inputted;

fourth field data holding means for holding the second field data to be one frame data together with the first field data held by the third field data holding means;

wherein said moving object area detecting means comprises field data dividing means for respectively dividing the first filed data held by the first field holding means, the second field data held by the second field holding means, the first field data held by the third field holding means and the second filed data held by the fourth field holding means into blocks of a predetermined size, field difference value calculating means for calculating an absolute value of a difference between each pixel data in the first field data held by the first field data holding means and each pixel data in the first field data held by the third field data holding means which are corresponded each other and an absolute value of a difference between each pixel data in the second field data held by the second field data holding means and each pixel data in the second field data held by the fourth field data holding means which are corresponded each other, and for calculating a total of calculated results for each of the blocks, and determining means for determining the block of which the absolute value total calculated by the field difference calculating means is larger than the predetermined threshold as data area for the image which moves dynamically, and said data transfer means transfer each pixel data in the block of the first field data held by the three field data holding means and determined as the data area of the image which moves dynamically by the determining means to the fourth field data holding means, said still image data generating means generate still image data by interlacing the first field data held by the third field data holding means and the second field data held by the fourth field data holding means.

5. A still image encoder according to the claim 1:

wherein said moving image data is data in conformity to NTSC.

6. A still image encoder according to the claim 1:

wherein said still image data coding means code the still image data into data in conformity to JPEG.

7. A still image encoder according to the claim 1:

wherein said still image data coding means code the still image data into data in conformity to ITU-T Recommendation H.260 Annex-D.

* * * * *